US009781238B2

(12) United States Patent
Schoerkmaier

(10) Patent No.: US 9,781,238 B2
(45) Date of Patent: Oct. 3, 2017

(54) HOUSING AND LOUDSPEAKER MODULE

(75) Inventor: Martin Schoerkmaier, Graz (AT)

(73) Assignee: ams AG, Unterpremstaetten (AT)

( * ) Notice: Subject to any disclaimer, the term of this patent is extended or adjusted under 35 U.S.C. 154(b) by 140 days.

(21) Appl. No.: 13/006,163

(22) Filed: Jan. 13, 2011

(65) Prior Publication Data

US 2011/0172001 A1 Jul. 14, 2011

(30) Foreign Application Priority Data

Jan. 14, 2010 (DE) ........................ 10 2010 004 667

(51) Int. Cl.
*H04M 1/00* (2006.01)
*H04M 1/03* (2006.01)

(52) U.S. Cl.
CPC ......... *H04M 1/035* (2013.01); *H04R 2460/01* (2013.01); *H04R 2499/11* (2013.01)

(58) Field of Classification Search
USPC ............................ 455/575.1; 381/71.1, 71.6
See application file for complete search history.

(56) References Cited

U.S. PATENT DOCUMENTS 5,182,774 A * 1/1993 Bourk .................. H04R 1/1083 379/430
5,809,156 A 9/1998 Bartels et al.
6,321,070 B1 * 11/2001 Clark et al. ................ 455/575.1
6,473,509 B2 * 10/2002 Albus et al. ................. 381/71.4
2002/0015502 A1 * 2/2002 Albus et al. ..................... 381/86
2005/0008167 A1 * 1/2005 Gleissner et al. .............. 381/74
2007/0054692 A1 * 3/2007 Nie et al. ...................... 455/522
2010/0105447 A1 * 4/2010 Sibbald et al. ............... 455/570

FOREIGN PATENT DOCUMENTS

DE 195 26 124 1/1997
DE 199 22 053 12/1999
GB 2 449 083 11/2008
JP EP 0661903 A2 * 7/1995 ............. H04R 3/005
JP 2008301131 A 12/2008

* cited by examiner

*Primary Examiner* — German J Viana Di Prisco
(74) *Attorney, Agent, or Firm* — McDermott Will & Emery LLP

(57) ABSTRACT

A housing (1) is provided which in particular is suitable for a mobile phone and, in addition to the customary loudspeaker housing (2) for accommodating a loudspeaker (4), comprises an additional housing (3) enclosing an additional volume of air (16) and being arranged in a preferential direction (V) for sound emission of the loudspeaker housing (2). Further, a loudspeaker module comprising the housing (1) as well as a loudspeaker (4), a microphone (8) and a control unit for active noise suppression is provided.

7 Claims, 2 Drawing Sheets

HOUSING AND LOUDSPEAKER MODULE

RELATED APPLICATION

This application claims the priority of German patent application 10 2010 004 667.1 filed Jan. 14, 2010, the entire content of which is hereby incorporated by reference.

FIELD OF THE INVENTION

The present invention relates to a housing, in particular for a mobile phone, as well as to a loudspeaker module, in particular for a mobile phone.

BACKGROUND OF THE INVENTION

In mobile phone technology it is quite frequent that surrounding noises in the vicinity of the ear of a listener interfere with the acoustic reception at the ear and hence the listening comprehension. This is why there is an increased need for so-called active noise suppression systems which are also referred to as ANC systems, active noise cancellation systems. In such systems, a pre-definable frequency band of an interfering surrounding noise in the region of the loudspeaker or at the ear of a listener is suppressed.

Document GB 2449083 A, for instance, shows an ANC system with a feed forward control.

Instead of a feed forward control, feedback control systems are also possible as an alternative, as they may be used in headphones, for instance. With a feedback ANC system of this type, the microphone is in front of the loudspeaker. In the ideal case, the loudspeaker reproduces a microphone signal phase-shifted by 180°. In doing so, an external interfering noise which is picked up by the microphone is simultaneously superimposed with its own but inverted signal provided by the loudspeaker. This results in destructive interference of the two signals so that, in the ideal case, the result is 0 and the listener does not perceive any surrounding noise. The adaptation of this control circuit to the transfer function between loudspeaker and microphone, in other words the so-called open loop response, is to be taken into consideration. This open loop response depends in particular on the connection of the control system to the user. This connection involves in particular the force with which the system is pressed against the ear and its distance thereto. Usually, this is no problem in case of headphones. When putting on or taking off a headphone, for instance, the open loop response indeed changes, but not in a way which may result in instabilities, in particular oscillations in the control circuit of the feedback ANC. To give an example, ear pads and a relatively large volume within the headphone shells are responsible factors.

With mobile phones, however, these conditions do not exist as ear pads are not necessary. Moreover, a defined distance between the loudspeaker of the mobile phone and the ear of the user does usually not exist. Rather, the distance from the loudspeaker or the microphone of the mobile phone to the ear of the user is individually different to a high degree.

An adaptive filtering process, for instance in the context of a digital filtering process, of the connection of the system to the user and hence of the resulting time-variant open loop response of the system could basically follow. Through this measure, instabilities, in particular undesired whistling noises with high sound pressures, could be avoided. However, it appears that these control systems including an adaptive, digital filtering process are very elaborate in their implementation and in addition have further disadvantages such as phase shifts in the control system, in particular due to the propagation effects in the required analog/digital and digital/analog conversion. These delay times and phase shifts may, in turn, result in undesired instabilities of the control system.

SUMMARY OF THE INVENTION

It is an object of the present invention to provide a housing which allows accommodating a loudspeaker and is suitable for the active noise suppression in a mobile phone. Furthermore, it is an object of the invention to provide a corresponding loudspeaker module suitable for a mobile phone.

One embodiment provides a loudspeaker housing for accommodating a loudspeaker. The loudspeaker housing comprises a preferential direction for sound emission, which is defined e.g. by openings in the loudspeaker housing. An additional housing is provided in front of this loudspeaker housing in the preferential direction for sound emission.

The additional housing allows providing an additional volume of air with defined characteristics in front of the loudspeaker housing. The housing, in particular for a mobile phone, comprises the loudspeaker housing and the additional housing in front of it.

Therefore, an additional volume of air is created by means of the additional housing. It has turned out that—in particular in case of a mobile phone—varying acoustic characteristics, for instance different densities or a varying distance between the housing and an ear have a lower impact on the open loop response of a control system which, in the context of a feedback active noise suppression, includes a loudspeaker in the loudspeaker housing as well as a microphone, for example in the additional housing, than is the case with customary systems without any additional volume of air.

The housing modified as proposed comprising an additional, defined volume of air in front of the real loudspeaker housing which is achieved by means of the additional housing, may be realized with comparably little effort in the mass production of mobile phones. The modified housing may be provided, for instance, with modified injection molds.

In particular, the suggested arrangement makes an elaborate adaptive digital control by means of digital filtering techniques and costly analog/digital and digital/analog converters and the undesired propagation effects associated therewith superfluous.

As the proposed arrangement reduces the dependency of the open loop response in terms of how tight a mobile phone comprising the suggested loudspeaker housing is pressed against the ear, possible instabilities of the whole control system in a feedback ANC system are also reduced and hence undesired whistling noises are avoided to a higher extent. In particular, it is possible to avoid the generation of high sound pressures which even may result in damaging the ear of the user.

In one embodiment, the additional housing is configured for accommodating a microphone.

The microphone serves in particular for picking up interfering surrounding noises in the area of the loudspeaker in the context of a suppression of interfering noises.

In one embodiment, the loudspeaker housing comprises at least one front opening connecting the loudspeaker housing to the additional housing.

The additional housing may have a larger extension than the front opening, at least in parts. Through this measure, a larger defined volume of air is created in the additional housing.

The front opening of the loudspeaker housing may define the preferential direction for sound emission of the loudspeaker housing. The front opening may have, for instance, a rectangular or round cross-section or be configured so as to be multi-part, for example by neighboring slots or several circular openings.

In the direction which is preferential for sound emission, i.e. acoustically seen behind the front opening of the loudspeaker housing, an output opening may be provided in the additional housing for the emission of sound to outside the housing. This output opening of the additional housing, which at the same time preferably forms an outside opening of the entire housing, may be e.g. a housing opening of a mobile phone housing through which the sound of the loudspeaker, having passed through the additional housing, may exit the mobile phone housing as a whole. Normally, an ear of a user of a mobile phone is pressed against said output opening which likewise may comprise several openings and include one or more housing openings like the loudspeaker housing at its front opening.

The at least one front opening of the loudspeaker housing and the at least one output opening of the additional housing may be congruent to each other in a common projection plane in the preferential direction of sound emission; alternatively, they may also be different. This depends on the desired acoustic characteristics.

In addition to the output opening and the front opening, the additional housing may comprise at least one further opening which is referred to as compensation opening. Said at least one compensation opening establishes a connection, for instance, between the additional housing and a further housing part which may enclose a further volume of air. This further housing part may be, for example, a system housing of a mobile phone. The compensation openings allow a shared acoustic use of the residual volume of a mobile phone outside the actual loudspeaker and additional housings.

In the acoustic sense, the at least one compensation opening represents a parallel resistance with respect to the resistance of the output opening. In case the acoustic resistance at the output opening, i.e. at the system output port, changes due to external influences such as the distance to an ear, the available volume of air, the density of the medium etc., the total acoustic resistance experienced by a loudspeaker accommodated in the loudspeaker housing only shows an irrelevant change due to the parallel total resistance. This is true in particular if the at least one internal compensation opening is sufficiently large with respect to the at least one output opening for sound emission.

For example, only one output opening for sound emission may be provided, but several internal compensation openings.

Due to the irrelevant change of the acoustic resistance with respect to the loudspeaker, fluctuations of the open loop response of a control loop in active noise suppression are further reduced, even with significant environmental changes.

Due to the construction including compensation openings, the residual volume in the mobile phone may likewise be used to additional advantage. This is of importance in particular in view of the progressive miniaturization, as an additional large volume for an acoustic balance within the phone housing is not necessary.

Especially in this case, the additional housing or the volume of air enclosed by the additional housing may be very small.

The additional housing may merely serve, for instance, to pick up a sound signal at the front opening of the loudspeaker housing and to distribute it to the at least one output opening and the at least one compensation opening.

In a further embodiment, the microphone is to be accommodated by the additional housing. The microphone may be realized, for example, as a so-called MEMS (micro-electro-mechanical system) microphone.

The at least one front opening, the at least one output opening and/or the at least one compensation opening may be provided with an acoustic grille, also sometimes referred to in the art as a speaker grill, covering the respective opening at least in parts.

Furthermore, the loudspeaker housing may comprise a back opening as additional compensation opening, i.e. a rear opening opposite the front opening. This rear opening preferably connects the volume of air of the loudspeaker housing to the surroundings of the overall housing, for instance of the mobile phone housing.

The acoustic resistance may be further increased in a selective manner depending on the requirements by means of acoustic grilles. It is possible, for instance, to have an influence on the acoustic total resistance described above irrespective of the size of the openings.

In a further development, the additional housing is designed such that the microphone can be attached to the front opening of the loudspeaker housing with a minimum distance.

In another embodiment, the housing may be designed such that the microphone can be attached to the acoustic center of the loudspeaker.

In one embodiment, the loudspeaker housing is formed so as to be substantially cuboid, and comprises a main side configured for being mechanically connected to the loudspeaker. The additional housing may also be cuboid.

It is preferred that the main side at least in parts extends in a plane which is orthogonal to the preferential direction of the sound emission.

Alternatively, the loudspeaker housing and/or the additional housing may have a round cross-section in a plane perpendicular to the preferential direction of sound emission.

The main side of the loudspeaker housing may form at the same time a rear side of the additional housing, at least in parts. Here, the front opening of the loudspeaker housing may simultaneously define an opening of the additional housing.

In another embodiment, a loudspeaker module is provided, in particular for a mobile phone, comprising a housing which is configured as described above as well as a loudspeaker arranged in the loudspeaker housing of the housing. Further, a microphone is arranged in the additional housing. In order to achieve active noise suppression, the microphone and the loudspeaker are coupled to each other in a feedback mode.

To this end, a control unit for active noise suppression may be coupled to the loudspeaker and the microphone, the control unit being configured to provide a compensation signal as a function of an interference noise signal provided by the microphone and to supply it to the loudspeaker after having superimposed it with a wanted signal.

The control unit may be, in particular, an analog control unit without any digital components, in particular without digital filter.

The control unit may comprise a filter connected to the microphone and filtering the interference noise signal. An inverting amplifier may be provided downstream the filter, which inverts the filtered interference noise signal and provides a compensation signal. Thus, the compensation signal may be superimposed to an actual wanted signal which is to be amplified, either by an amplifier or by the loudspeaker, in such a manner that an active noise suppression of the interference sound is achieved.

Due to the suggested construction of the housing, alterations of the open loop response of the feedback control system described do not result in instabilities of the controller. In particular, undesired whistling noises and, along with these, inadmissible high sound pressures are effectively avoided.

DETAILED DESCRIPTION OF THE DRAWINGS

Figure 1:
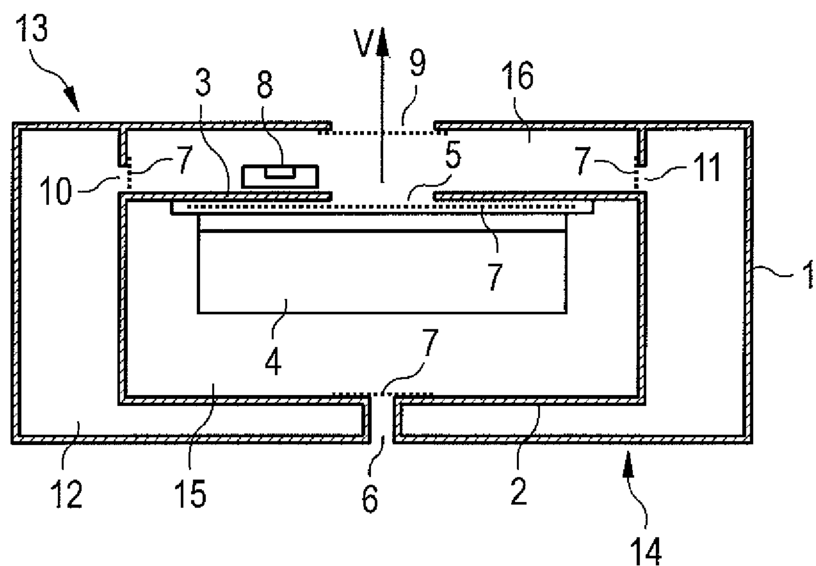
FIG. 1 shows an exemplary embodiment of a housing according to the invention.

FIG. 1 shows a mobile phone housing 1 comprising a loudspeaker housing 2 and an additional housing 3. The loudspeaker housing 2 is configured for accommodating a loudspeaker 4. To this end, the loudspeaker housing 2 is formed so as to be essentially cuboid. The loudspeaker 4 is centrally fastened to a front side of the loudspeaker housing 2 comprising a front opening 5. The front side defines the main side of the loudspeaker housing. In addition to the front opening 5, a rear opening 6 is provided in the loudspeaker housing 2, arranged on a rear wall of the loudspeaker housing in a center position, i.e. opposite the front opening 5. The loudspeaker 4 is fastened to the main side of the loudspeaker housing via an acoustic grille 7, it being preferred that the loudspeaker is glued to the acoustic grille and the acoustic grille is glued to the front side of the loudspeaker housing.

Starting from the loudspeaker 4 which creates a corresponding sound pressure when a signal is applied, a signal is emitted in a preferential direction V, in FIG. 1 occurring orthogonally to the main side of the loudspeaker housing and through the front opening 5 of the loudspeaker housing.

The additional housing 3 accommodating a microphone 8 is provided in front of the loudspeaker housing 2 as seen in the preferential direction V. The microphone 8 is attached to the main side of the loudspeaker housing 2 near the front opening 5, this main side also defining the rear side of the additional housing 3. The microphone 8 serves as a measuring microphone for recording interference noise. Opposite the front opening 5, the additional housing 3 comprises an output opening 9 which, in the present example, is realized so as to be congruent to the front opening in projection in the direction of sound propagation V. The four side walls of the additional housing 3 which extend parallel to the preferential direction V are aligned in each case with the four side walls of the loudspeaker housing 2.

A defined volume of air 16 is created in front of the loudspeaker 4 by means of the additional housing 3, regardless of whether air or another medium is in front of the output opening 9. The volume of air 16 in the additional housing 3 is in particular not influenced by the fact whether an ear is held or pressed against the output opening 9.

The additional housing 3 comprises two internal compensation openings 10, 11 in addition to the front opening 5 and the output opening 9. These compensation openings are formed in two opposite walls of the four side walls of the additional housing and each establishes a connection to a third housing portion beside the loudspeaker housing 2 and additional housing 3, which is identified by reference numeral 12 and may be understood as a residual volume of the mobile phone. Reference numeral 13 designates the upper side of the mobile phone facing a user during a phone call and reference numeral 14 refers to the rear side of the mobile phone facing e.g. the hand of the person making a phone call.

According to the suggested arrangement, not only the rear volume 15 of the loudspeaker 4 in the loudspeaker housing 2 is used in an acoustic manner, but also the residual volume 12 of the mobile phone via the additional front volume 16 of the additional housing.

The housing which is suggested shows a defined acoustic behavior suitable for minimizing external influences on the transfer function between loudspeaker 4 and microphone 8.

The front volume 16 allows breaking up the usually direct connection between the loudspeaker 4 or the front opening 5 of the loudspeaker housing and the ear of the user and expanding it by an additional front volume 16 which itself may be kept very small but allows distributing the sound signal to various openings. Moreover, the additional housing accommodates the microphone 8.

Internal compensation openings 10, 11 extend into the third housing 12, that may be the housing of a mobile phone or the like, in which the electronic components and further phone components such as an accumulator, a display, a keypad etc. are accommodated. These internal compensation openings 10, 11 are arranged, so to speak, parallel to the system output, i.e. to the output opening 9 and make it possible that there is only little influence on the loudspeaker and in particular on the transfer function between the loudspeaker and the microphone when the external influences in front of the output 9 are changing. The proposed acoustic grilles 7 offer an additional increase in the acoustic resistance.

A problem solved by the invention is to provide relatively constant acoustic conditions irrespective of whether a human ear is present at the system output port 9. This is achieved by the front volume between loudspeaker and ear, which is constant. Further improvement can be provided by the internal compensation openings 10, 11 which make the front volume significantly bigger by accessing the remainder volume 12 (or residual volume 12), while at the same time allowing for small dimensions of the loudspeaker system in e.g. a mobile phone. This allows for slim design. In other words, from the loudspeaker's perspective, the acoustic resistance is no longer defined mainly by the path from opening 5 through opening 9 to the outside, (which may or may not be covered by a human ear and thus may change tremendously), but instead by an acoustic parallel connection of the opening 9 with the compensation openings 10, 11. Therefore, if the acoustic resistance of the opening 9 changes by covering with a human ear, thanks to the parallel connection, the total acoustic resistance as seen by the loudspeaker remains almost constant.

Figure 3:
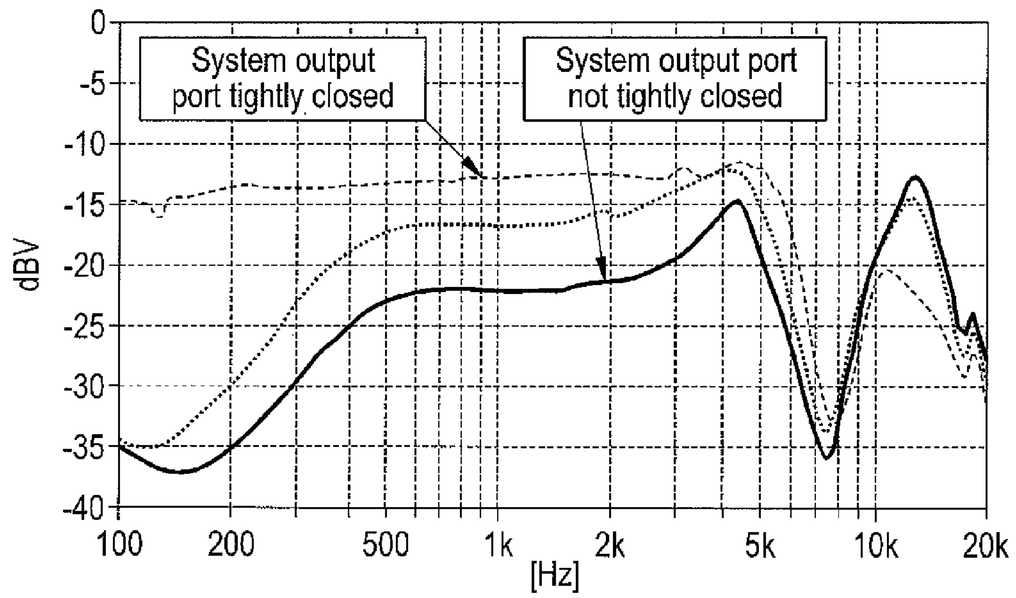
FIG. 3 shows an exemplary variation of the open loop response over the relevant acoustic frequency range in case of a prior art housing.
Figure 4:
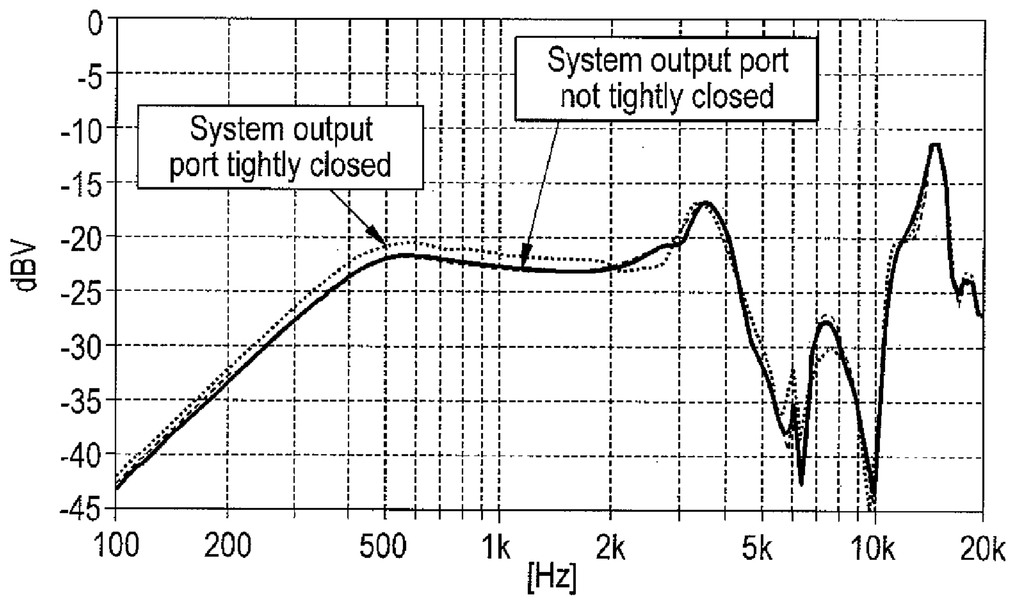
FIG. 4 shows an exemplary variation of the open loop response when using the housing of FIG. 1.

The low variation of the acoustic resistance with respect to the loudspeaker minimizes fluctuations in the open loop response, which is clearly shown by the comparison of the frequency responses of FIGS. 3 and 4. This will be discussed in more detail below.

As a whole, the proposed housing 1 comprising the microphone 8 and the loudspeaker 4 as well as the corresponding openings may be assembled to form a compact module. This module may be tested prior to its installation and prior to its adaptation to a mobile phone and hence easily adapted to different phone designs. A cost-effective analog feedback control within the scope of an active noise suppression is possible due to a virtually constant open loop response being ensured irrespective of external conditions, for instance the distance to an ear.

The module, or rather the control circuit which is described in the following on the basis of FIG. 2, may be calibrated prior to its installation in the phone. The residual volume 12 of the phone is also used for improving the acoustics.

Figure 2:
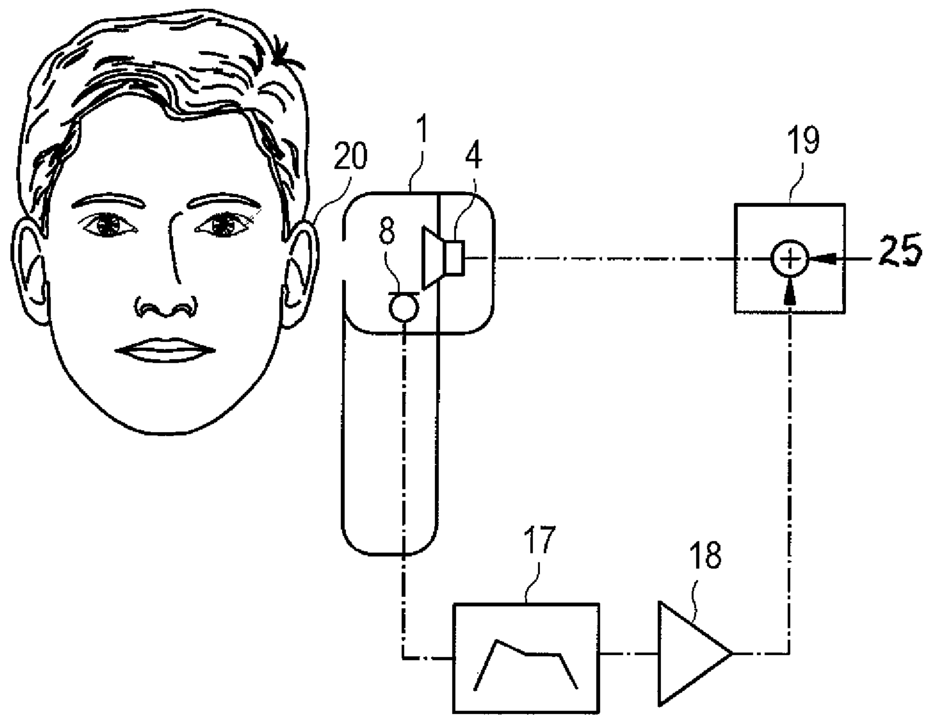
FIG. 2 shows an exemplary embodiment of the suggested active noise suppression comprising a housing according to FIG. 1.

FIG. 2 shows an example of a control loop for active noise suppression together with the housing 1, the loudspeaker 4 and the microphone 8. The housing 1 comprises the loudspeaker 4 as well as the microphone 8 and is located at a variable distance to an ear 20 of a user. The microphone 8 picks up an interference noise signal which is supplied to an analog filter 17 connected to the microphone. The analog filter, in turn, is connected to the input of an inverting amplifier 18 whose output is connected to a superposition element 19. The superposition element 19 superimposes the fed-back inverted interference noise signal in the form of a compensation signal with a wanted signal 25 which likewise is fed to the superposition element 19. The output of the superposition element 19 is connected to an input of the loudspeaker 4. This results in a control loop for active noise suppression, i.e. for suppressing interfering ambient noise at the ear 20 of the listener. In the ideal case, the loudspeaker reproduces a microphone signal with a phase shift of 180°.

Accordingly, the control system causes an interference noise hitting the microphone 8 from outside being simultaneously superimposed with its own inverted signal from the loudspeaker 4. The destructive interference of both signals results in the elimination of the interference noises at the ear 20 of the user so that they are not perceived by the user. The filter 17 serves for adapting the control circuit to the transfer function between the loudspeaker 4 and the microphone 8, being referred to as open loop response. This allows ensuring a favorable amplification and phasing for the inversion of the incoming interference noise for each frequency range. The filter 17 also serves to stabilize the control circuit and to suppress possible instabilities of the system such as e.g. oscillation tendencies at the edges of the frequency band of noise suppression.

The open loop response is determined by five factors, namely by:

1. the characteristics of the loudspeaker 4,
2. the characteristics of the microphone 8,
3. the relative position between them, for instance distance and angle,
4. the acoustic conditions of the enclosing housing 1, and
5. the connection of the system to the user.

The last point means, for instance, the force with which the housing is pressed against the ear of the user and the distance therebetween.

Points 1 to 4 are stably determined by the mechanical construction so that the system in this respect may be described as a time-invariant system. The fifth point, however, is highly variable in the case of a mobile phone and individually depends on the user and the speaking situation.

In contrast, when implementing a system for active noise suppression it is usually assumed that a time-variant system is involved which means that the open loop response does not change during application. While this is usually the case with headphones, it is not true in particular for mobile phones.

In customary mobile phones, the loudspeaker is located directly below the shell of the mobile phone housing and the connection between the ear and the loudspeaker is merely established by one or more small openings, i.e. output openings. Therefore, the front opening 5 and the output opening 9 are identical with existing solutions. If a customary system is expanded by a microphone directly provided on the loudspeaker as illustrated in FIG. 2, the system would be operative in principle, but the open loop response would be highly dependent on the system connection to the user.

FIG. 3 shows this dependency for a customary system without the additional housing proposed. It can be seen that the typical frequency response of the open loop response shows significant changes as a function of how close the mobile phone is coupled to the ear of the user and the size of the remaining residual volume of air between the output opening of the housing and the ear. The open loop response exhibits very high amplification the tighter the mobile phone is pressed against the ear. The extreme case will occur when the system output port, i.e. the output opening is completely closed. This can be clearly seen on the basis of FIG. 3, in particular with low frequencies.

In contrast, FIG. 4 shows that the open loop response is virtually constant in the proposed loudspeaker housing comprising the additional housing according to FIG. 1 when used in a mobile phone, regardless of whether the system output port, i.e. the output opening 9, is tightly closed or not. Thus, the frequency response is virtually independent of the circumstances outside the phone housing in front of the loudspeaker. This means that the desired specification as a time-invariant system is achieved, i.e. all five factors for determining the form of the open loop response indeed remain constant regardless of the behavior of the operator.

In a variation of the arrangement shown in FIG. 2, the output of superposition element 19 is amplified by an amplifier (not shown) coupled between itself and loudspeaker 4. Alternatively, loudspeaker 4 can provide the amplifying function.

It goes without saying that the suggested principle may also be advantageously used in other applications apart from mobile phones, in which active noise suppression is desired and where the open loop response depends on external circumstances.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

I claim:

1. A housing for a mobile phone, said housing comprising:

a loudspeaker housing provided for accommodating a loudspeaker and substantially enclosing a first volume of air;

an additional housing substantially enclosing a second volume of air and being arranged in a preferential direction for sound emission of the loudspeaker housing, wherein a microphone is arranged in the additional housing; and a control unit serving for active noise suppression, the control unit being coupled to the loudspeaker and the microphone, wherein the additional housing comprises:

at least one compensation opening for establishing a connection to a system housing enclosing a third volume of air, and at least one output opening configured to emit sound to outside the housing, and to reduce fluctuations of an open loop response of the control unit, and wherein the open loop response is a transfer function between the loudspeaker and the microphone.

2. The housing according to claim 1, wherein the loudspeaker housing comprises at least one front opening connecting the loudspeaker housing to the additional housing, the additional housing having a lateral extension which at least in parts is larger than the at least one front opening.

3. The housing according to claim 2, wherein at least one of the at least one front opening, the at least one output opening and the at least one compensation opening are covered by an acoustic grilles at least in parts.

4. The housing according to claim 1, wherein the loudspeaker housing is substantially formed so as to be cuboid and comprises a main side configured to provide a mechanical connection to the loudspeaker.

5. The housing according to claim 4, wherein the main side of the loudspeaker housing forms a rear side of the additional housing at least in parts.

6. A loudspeaker module for the mobile phone, comprising:

the housing according to claim 1;

a loudspeaker arranged in the loudspeaker housing; and the control unit being configured to provide a compensation signal as a function of an interference noise signal provided by the microphone and to supply the interference noise signal, superimposed by a wanted signal, to the loudspeaker.

7. The loudspeaker module according to claim 6, wherein the control unit further comprises:

an amplifier for amplifying the superimposed wanted signal, comprising an output coupled to the loudspeaker;

a filter coupling the microphone to the amplifier and serving to filter the interference noise signal; and an inverter providing the compensation signal as a function of the filtered interference noise signal and superimposing the compensation signal to the wanted signal in an inverted manner.

* * * * *